United States Patent [19]

Manchester et al.

[11] 4,138,147

[45] Feb. 6, 1979

[54] COUPLING DEVICE

[76] Inventors: Luther L. Manchester, 810 Woodstock, Bellaire, Tex. 77401; Bobby J. Reneau, 15527 Morales, Houston, Tex. 77039

[21] Appl. No.: 754,839

[22] Filed: Dec. 27, 1976

[51] Int. Cl.² ............................................. F16L 27/00
[52] U.S. Cl. ...................................... 285/165; 285/261; 285/323; 285/343
[58] Field of Search ............... 285/164, 165, 339, 323, 285/18, 302, 343, 421, 382.7, 341 (U.S. only), 261

[56] References Cited

U.S. PATENT DOCUMENTS

| | | | |
|---|---|---|---|
| 1,824,422 | 9/1931 | Badger | 285/302 |
| 2,137,853 | 11/1938 | Nixon | 285/341 X |
| 2,676,037 | 4/1954 | Mueller | 285/341 X |
| 3,056,617 | 10/1962 | Snoddy | 285/341 |
| 3,695,640 | 10/1972 | Clague | 285/341 X |
| 3,712,647 | 1/1973 | Stecher | 285/341 X |
| 3,733,093 | 5/1973 | Seiler | 285/382.7 |

*Primary Examiner*—Thomas F. Callaghan

[57] ABSTRACT

A variable length coupling device for connecting together first and second flowlines for the passage of fluid therethrough including first and second housing sections having alignable bores. The first housing section is adapted for connection at various angular positions to the first flowline and the second housing section to receive and is sealingly attached to the second flowline in response to the interconnection of the first and second housing sections. An actuator sleeve, force transfer sleeve and wedging seal ring are mounted within the first and second housing section bores for movement into gripping, sealing engagement against the second flowline in response to connection of the first and second housing sections together. In a further embodiment, a third housing section is interposed between the first and second housing sections and the actuator sleeve, force transfer sleeve and a seal ring mounted therein for movement into gripping, sealing engagement against the second flowline in response to connection of the first and second housing sections to the third housing section.

7 Claims, 6 Drawing Figures

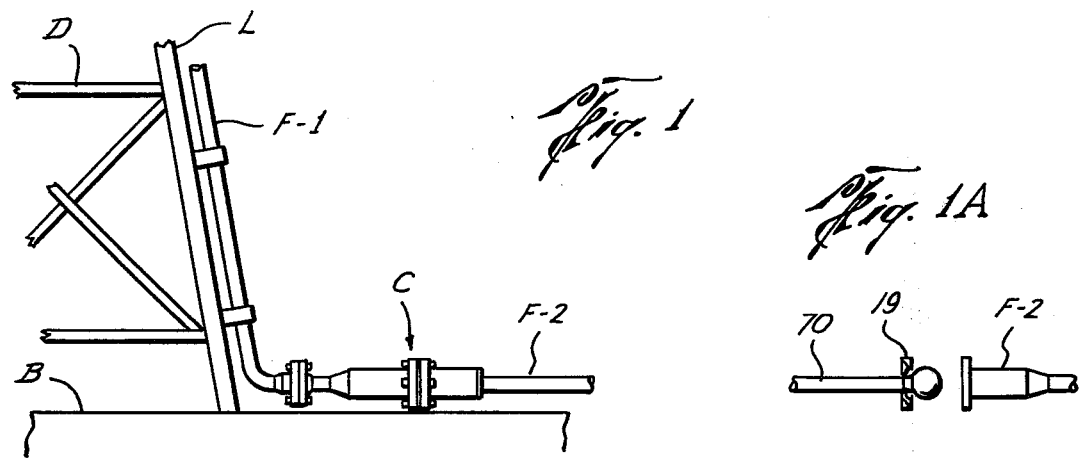
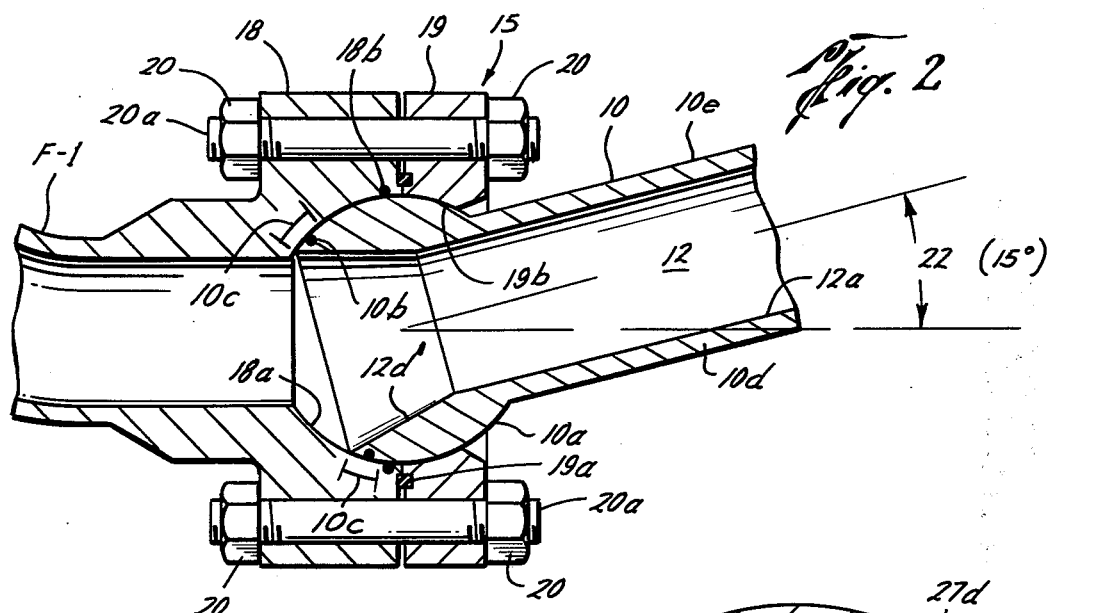
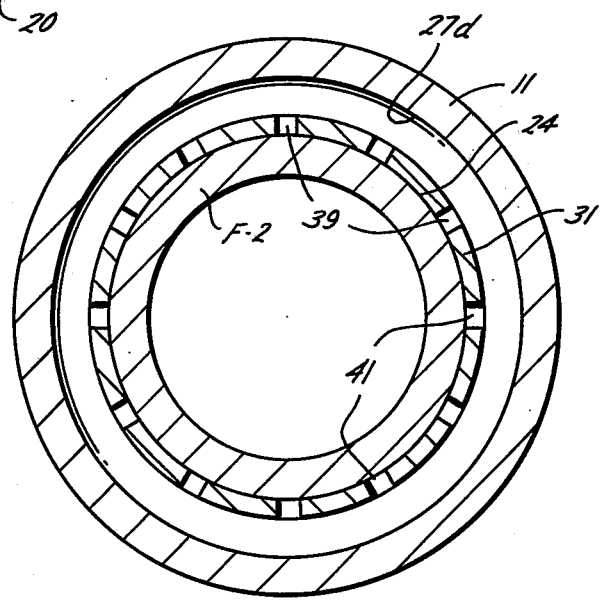

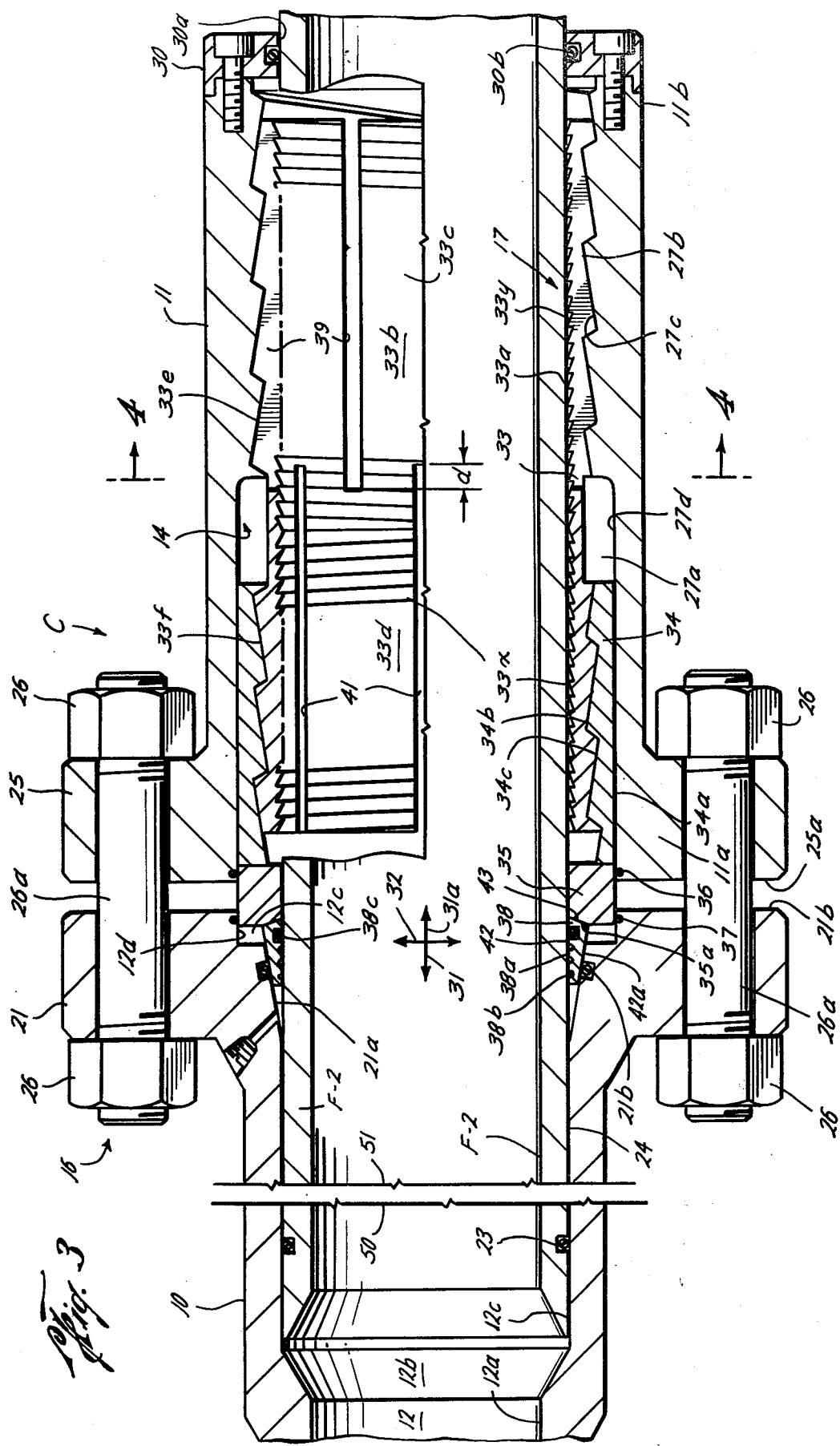

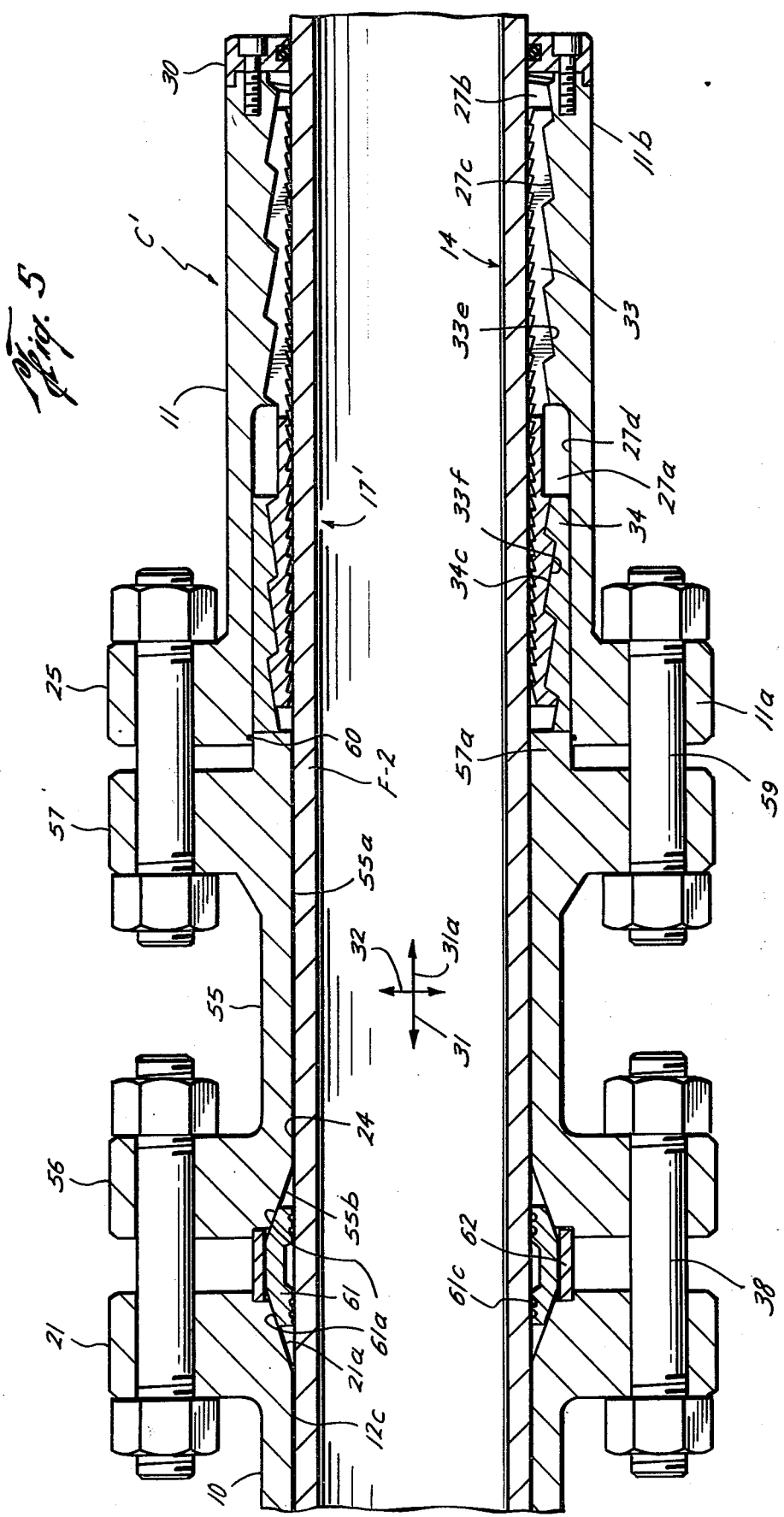

COUPLING DEVICE

BACKGROUND OF THE INVENTION

The field of this invention is coupling devices for connecting together first and second flowlines, and in particular, to connect together such flowlines in an adverse environment such as underwater.

The connecting together of the end portions of two flowlines has presented several problems. First of all, the flowlines may not be exactly aligned thus preventing the making of a simple, straight connection. Secondly, the distance between the end portions of the two flowlines to be connected will vary from application to application. Such problems are compounded when the connection is to be made underwater.

There are various prior art devices which attempt to solve one or more of the problems associated with the making of such underwater connections. The following patents are directed to devices which utilize hydraulic pressure to make such connections: U.S. Pat. Nos. 3,393,926; 3,598,429; 3,695,634; 3,784,234; 3,704,033; 3,713,204; 3,353,847; and 1,807,046.

Further, U.S. Pat. No. 3,353,847 discloses a gear-actuated coupling device. U.S. Pat. No. 1,807,046 may also be of interest.

SUMMARY OF THE INVENTION

This invention relates to a new and improved coupling device for connecting two sections of a pipeline underwater. The coupling device includes housing sections with flanges which are adapted to connect together two sections of a pipeline or flowline with a gripping and sealing connection in response to mechanical movement of the flanges towards each other. The coupling device is longitudinally adjustable to compensate for variations in the distances between the ends of the particular pipes or flowlines being connected. One of the housing sections is provided with means for effecting a connection to a non-axially aligned pipe. The device further includes second and/or third housing sections mounting a gripping and sealing sleeve and rings which are movable into gripping, sealing engagement with the second flowline in response to connection of the housing sections together. It should be understood that this description of this invention is for the purposes of providing a summary of the invention only; and, it is the claims of this patent and not this summary which define the scope of this invention.

BRIEF DESCRIPTION OF THE DRAWINGS

FIG. 1 is a schematic view of the variable distance coupling device of this invention illustrated in position for connecting together first and second flowlines in order to allow fluid movement therebetween;

FIG. 1A is a section of an additional embodiment of the device of FIG. 1;

FIG. 2 is a sectional view of the connection of the coupling device to the first flowline at various angular positions;

FIG. 3 is a continuation of FIG. 2 and illustrates in section the remainder of the coupling device and its gripped, sealed connection to a second flowline;

FIG. 4 is a sectional view taken along line 4—4 of FIG. 3; and

FIG. 5 is a sectional view of a second embodiment of the variable distance coupling device of this invention.

DESCRIPTION OF THE PREFERRED EMBODIMENT

This invention is directed to variable distance coupling devices C and C' which connect together a first flowline F-1 and a second flowline F-2.

A derrick or platform D has a leg L that extends upwardly from the bottom B of the ocean. The derrick D usually has supported thereon one or more storage vessels (not shown) for receiving oil or gas from the flowline F-2 which is typically connected to one or more offshore oil or gas wells (not shown). The variable distance coupling devices C and C' of this invention are particularly suited for coupling together flowlines F-1 and F-2 in spite of the flowlines being non-aligned with respect to each other (such as at different elevations) and in spite of the flowline end portions being located at various distances from each other. As will be explained, such connection may be accomplished underwater with a minimum of equipment and time, since the basic coupling devices C and C' are made up at the surface prior to taking it underwater. The term "flowline" includes any pipeline, pipe, tubing, casing or any other conduit used to transfer liquid and/or gases.

The variable distance coupling device C of the embodiment of this invention illustrated in FIGS. 1-4 basically includes a first housing section 10 adapted for connection to the first flowline F-1 and a second housing section 11 adapted for connection to the second flowline F-2. The first flowline section 10 has a cylindrical bore 12 formed by cylindrical wall portion 12a which extends longitudinally therethrough. The second housing section 11 has a bore generally designated as 14 extending longitudinally therethrough. The bores 12 and 14 provide for the passage of fluid between the flowlines F-1 and F-2. The first housing section 10 includes a first flowline connector means generally designated by the number 15 for connecting the first housing section to the flowline F-1 at various angular positions. Housing interconnection means generally designated by the number 16 is provided for connecting together the housing sections 10 and 11; and, a grip-seal means generally designated by the number 17 is mounted within the housing bores 12 and 14 for gripping and sealing the second flowline F-2 in response to the interconnection of the first and second housing sections by interconnection means 16.

The flowline F-1 is illustrated in FIGS. 1 and 2 as extending approximately vertically adjacent derrick leg L and terminating in a curved section and flange 18. The flowline F-1 may be positioned horizontally or vertically and terminate in a straight section also. The flange 18 has a curved inside surface 18a and an O-ring seal 18b positioned therein. The first flowline connector means 15 is formed as part of the first housing section 10 to mount the coupling C at various angular positions with respect to flowline F-1. The first housing section 10 terminates in a substantially spherical portion 10a adapted to fit against the curved, concave interior flange surface 18a, the radius of curvature for surface 18a and spherical portion 10a being substantially equal. An O-ring 10b is mounted in spherical end portion 10a to slidably, sealingly engage the flowline wall 18a.

The O-ring 10b provides a seal and is for testing purposes only. The diameter of an annular ring area 10c of spherical portion or nose 10a is slightly larger in diameter than the adjacent or mating inside wall area 18a so that, upon assembly, a metal-to-metal seal is accomplished. The remainder of the nose 10a has a diameter slightly less than the diameter of interior surface 18a.

An annular flange portion 19 is initially loosely mounted over the first housing section 10 for connection by nut and bolt combinations 20 to the first flowline flange 18. A gasket 19a is mounted in the face of flange ring 19 for sealingly engaging the face of flange 18. In addition to the spherical end portion 10a, main portion 10d of the first housing section 10 has a cylindrical outside surface 10e which cooperates with cylindrical bore 12 to provide a main, generally tubular section terminating in flange 21 adjacent the second housing section 11. The flange 19 has an interior surface portion 19b having at least in part a curved surface adapted to fit the curvature of the spherical housing portion 10a. The radius of curvature of the curved portion 19b is substantially the same as the radius of curvature of the spherical end portion 10a so that the flange 19 will fit and conform to the spherical end portion 10a in a position adjacent to and parallel (as viewed in FIG. 2) with the first flowline flange 18 in order to receive the nuts 20 and bolts 20a therewith. The spherical end portion 10a of the first housing section allows the connection to be made between flanges 18 and 19 at various angular positions with respect to the flowline F-1. For example, the first housing section 10 illustrated in FIG. 2 is shown at an acute angle 22 with respect to line 22a, which may represent horizontal. The bore 12 of first housing section 10 terminates in an interior, flared section 12d, which allows for uninterrupted flow through the connection of the flowline F-1 and first housing section 10. The taper of the flared wall of bore section 12d' is 15°; this flare provides for angular positioning with the first housing section 10 at up to 15° with respect to the end of flowline F-1. For at a 15° angle of inclination, a part of the flared wall 12d will be flush with the inside wall of flowline F-1. Thus, the tapered wall 12d' allows for unobstructed flow into first housing section bore 12 in spite of positioning the entire first housing section 10 at angular deviations of up to 15°.

The bore 12 of first housing section 10 includes an enlarged cylindrical bore portion 12b formed by interior wall portion 12c for receiving the flowline F-2. The diameter of the inside wall portion 12c is approximately equal to the outside diameter of the flowline F-2 such that O-ring seal 23 prevents the passage of fluid between the wall portion 12c and the outside surface 24 of the flowline F-2. The flange 21 includes an inside wall portion 21a which forms part of the enlarged bore 12b but is flared to provide an inclined surface spaced inclined away from the outside surface 24 of the flowline F-2. An O-ring seal 21b is positioned in the inclined surface 21a.

The second housing section 11 terminates in a flange 25 at the housing end 11a adjacent the first housing section 10. The flange 25 is sized for hole alignment with first housing section flange 21 in order to receive nuts 26 and bolts 26a therewith to form interconnection means 16 for interconnecting the first and second flange sections. Other end 11b of the second housing section 11 is open by the bore 14 to receive the flowline F-2.

The bore 14 for the second housing section 11 includes bore portions 27a and 27b. The bore portion 27b is formed by an inside wall having a plurality of camming or wedging surfaces 27c therein. The camming surfaces 27c of the bore portion 27b are inclined outwardly from second housing section end 11a to end 11b. The bore portion 27a is formed by a smooth, cylindrical inside wall portion 27d of an internal diameter larger than the diameter of outside flowline surface 24 such that an annular space is formed. The enlarged bore 12b of the first housing section 10 includes a bore end portion 12c formed by wall 12d which is alignable with bore portion 27a to cooperate therewith.

A rim or annular cap 30 is mounted onto housing end portion 11b by means of cap screws. The annular cap 30 includes an interior, cylindrical wall portion 30a of a diameter substantially equal to the diameter of outside flowline surface 24. An O-ring seal 30b is positioned in the cap inside surface 30a for sealingly engaging the outside flowline surface 24.

For the purposes of this discussion, longitudinal movement will be defined as movement in either direction parallel to the longitudinal axis of the first and second housing sections 10 and 11. Longitudinal movement of housing section 11 toward housing section 10 is identified by arrow 31, and movement of housing section 11 away from housing section 10 is defined by arrow 31a. Radial movement is defined as movement perpendicular to the longitudinal direction and is represented by arrow 32.

The grip-seal means 17 includes an actuator sleeve or collet 33 mounted onto the camming surfaces 27c of the bore portion 27b for movement longitudinally and radially with respect to the second housing section for gripping the flowline F-2 and for moving a force transfer sleeve 34. The force transfer sleeve 34 is mounted in the bore portion 27a between wall portion 27d and actuator sleeve or collet 33 for longitudinal movement in response to movement of the actuator sleeve or collet 33. A housing sealing ring 35 is also mounted in the second housing bore portion 27a and in first housing section bore portion 12c adjacent to the force transfer sleeve 34. An O-ring 36 is mounted in the bore wall portion 27d of the second housing section very near to flange face 25a; and, O-ring 37 is mounted in bore portion 12c of the first housing section 10 which is aligned with the bore portion 27a.

The grip-seal means 17 further includes a sealing ring 38 mounted against inside, inclined flange surface 21a of the first housing section adjacent to the housing seal ring 35.

The actuator sleeve or collet 33 has a generally hollow, cylindrical configuration defined by inside wall 33a and outside wall 33b. For the purposes of discussion, the sleeve includes a right half 33c and a left half 33d, although the collet is a one-piece unit. The inside sleeve wall 33a is cylindrical in configuration and has oppositely directed buttressed threads machined in each half of the inside wall for firmly gripping the outside flowline surface 24.

Referring in particular to FIG. 3, the right half 33c of the outside sleeve surface has a plurality of camming or wedging surfaces 33e which are inclined outwardly from housing end 11b towards housing end 11a and are thus complementary to the interior wall camming surfaces 27c on the second housing section. In this manner, movement of the entire second housing section 11 in the direction of arrow 31 toward the first housing section 10 will cause an interaction of the interior housing wall camming surfaces 27c with the exterior sleeve camming surfaces 33e thereby wedging and thus moving the actuator sleeve radially inwardly into gripping engagement with the outside flowline surface 24 and/or perhaps moving the sleeve 33 longitudinally relative to flowline F-2 in the direction of arrow 31, depending upon the initial position of ring 38.

A plurality of longitudinally directed slots 39, preferably six or more in number are machined into the right half 33c of the actuator sleeve 33 at 60° or less intervals. Further, a plurality of longitudinally directed slots 41 are machined in left half 33d of the actuator sleeve 33, preferably six or more in number, also. The slots 39 and 41 overlap a selected distance d, preferably at approximately the center of the actuator sleeve 33. The six slots 41 are also positioned at 60° or less intervals but are staggered from the slots 39 such that the slots combine in the overlapping portion as viewed in FIG. 4 to be located every 30° or less around the circumference of the sleeve at the middle section. The purpose of the slots 39 and 41 is to make the actuator sleeve radially yieldable for movement radially inwardly in response to the radial force exerted by the camming action of the interior housing wall surfaces 27c against the outside camming surfaces 33e of the sleeve 33. The middle portion of sleeve 33 wherein the slots overlap a distance d is provided so that the sleeve 33 is yieldable throughout its full length.

The left half 33d of the outside surface of the actuator sleeve includes a plurality of camming surfaces 33f which are inclined outwardly from housing end 11a towards housing end 11b. Thus the angle of inclination of the camming surfaces 33f is opposite to that of the camming surfaces 33e on the right half of the actuator sleeve 33.

The force transfer sleeve 34 has a smooth outside surface 34a adapted to slidably engage the bore wall portion 27d. The inside surface 34b of the force transfer sleeve 34 includes a plurality of camming surfaces 34c which are complementary to the camming surfaces 33f of the left half 33d of the actuator gripper sleeve 33. Thus, the camming surfaces 34c of the force transfer sleeve 34 are inclined radially outwardly from housing end 11a towards housing end 11b. In this manner, longitudinal movement of the actuator sleeve 33 in response to longitudinal movement in the direction of arrow 31 of the second housing section 11 toward first housing section 10 will cause slight longitudinal movement of the force transfer sleeve 34 in that same longitudinal direction. This is due to the action of the surfaces 27c of the interior wall of the second housing section 11 acting against the complementary surfaces 33e on the right half 33c of the actuator sleeve 33. Until longitudinal movement of the gripper sleeve 33 is prevented, by the setting or seating of the seal ring 38, as will be explained, the sleeve 33 does not move radially inwardly into gripping engagement with the outside flowline surface 24. Movement of the actuator sleeve 33 in the direction of arrow 31 moves the force transfer sleeve 34 in the same direction due to the engagement of outside actuator sleeve surfaces 33f with the force transfer sleeve inside surfaces 34c.

The housing seal ring 35 is preferably metal, such as steel alloy, and is of sufficient width to extend across the flange faces 25a and 21b and across seals 36 and 37, respectively, in order to effectively seal against the passage of fluid between the housing sections 10 and 11. The housing seal ring 35 is moved into this final sealed position as illustrated in FIG. 3 due to longitudinal movement of the force transfer sleeve 34 in the direction of arrow 31.

The preferred cross-sectional configuration of the seal ring 38, as viewed in FIG. 3, is frusto-conical, and it is preferably metal, such as a steel alloy. The inside surface 38a has a diameter approximately equal to the diameter of flowline outside surface 24 and includes several annular relief grooves 38b to concentrate the sealing action at spaced points against the outside flowline surface 24. The seal thus provided is a metal-to-metal seal. An O-ring seal 38c is positioned in the inside surface 38a for use with seal 23 in initially testing the sealing between flowline F-2 and the housing sections 10 and 11.

Outside surface 42a of the ring 38 is inclined at the same angle of inclination as interior flange surface 21a in order to mount the ring 38 for slidable, wedging movement. Finally, end portion 43 of the ring 38 is inclined with respect to a radial section plane to engage a complementary inclined surface portion 35a on the housing seal ring 35. The inclined surface 35a of the housing seal ring cooperates with the inclined surface 43 of the seal ring 38 to move the seal ring 38 longitudinally in the direction of arrow 31 to cause a wedging of the seal ring 38 between inside flange surface 21a and flowline outside surface 24 to provide the desired metal-to-metal seal.

The coupling device C of this invention is particularly suited for use underwater. The coupling device C is installed in the following manner. The first and second housing sections 10 and 11 are connected together at flanges 21 and 25 with rings 35 and 38 and sleeves 33 and 34 positioned in bores 12b and 14. The flowline F-2 is then inserted into the bore 14 of the second housing section and into the enlarged bore portion 12b of the first housing section with the device C on a vessel or other location above the water or at the surface. It is contemplated the part of flowline F-2 actually inserted into the coupling device is welded onto the actual flowline before lowering the flowline and device C to the ocean floor. This insures proper sizing of the part of F-2 inserted into the device C. The coupling device C in the fully assembled condition is then lowered into the water with the flowline F-2. The spherical end portion 10a of the first housing section 10 is inserted into the first flowline flange 18. The loosely mounted flange 19 is then aligned against the first flowline flange 18 and the nuts 20 are drawn up tightly on the bolts 20a. To bring the flange 19 against or near the flange 18 before tightening the nuts 20, it may be, and usually is, necessary to longitudinally move the flowline F-2 in first housing section bore portion 12b to compensate for the distance from the end of the flowline F-1 to the end of the flowline F-2. The length of the bore portion 12b can be made of different lengths as illustrated by break lines 50 and 51. Due to the spherical configuration of housing end portion 10a, the coupling device C and the flowline F-2 can be oriented in various angular positions relative to the flowline F-1. Then, after the nuts 20 on the connector 15 are tightened, the nuts 26 and bolts 26a holding flanges 21 and 25 are tightened mechanically to move the second housing section 11 toward the first housing section 10. Usually, the nuts 20 on the connector 15 and the nuts 26 on the coupling C are tightened by a diver with a wrench or suitable mechanical nut-tightening device such as an impact wrench. This longitudinal movement of the second housing section 11 toward the first housing section 10 will move the actuator sleeve 33 longitudinally with respect to the housing section 11 causing the actuator sleeve 33 to engage and move longitudinally the force transfer sleeve 34, as previously explained, so as to move, force, or radially compress the seal ring 38 longitudinally into the sealing position between the outside surface 24 of the flowline F-2 and the inside flange surface 21a. The seal ring 38 is wedged so tightly that a forging occurs in that the metal of ring 38 is forged into the flowline wall 24. Thereafter, continued tightening of the nuts 26 causes the gripping sleeve 33 to be radially compressed inwardly to force its gripping teeth 33x and 33y into biting engagement with the pipe surface 24 to prevent further longitudinal movement of the pipe F-2 relative to the coupling device C. The radial inward movement of the teeth or threads 33x and 33y is due to the camming action between inclined surfaces 27c, 33b and 33f, 34c, as previously explained. The sleeve 33 is also pressed against outside flowline wall 24 with such force that an embedding of threads 33x and 33y occurs to grippingly attach the sleeve or collet 33 to the flowline F-2. At this point, the flowline F-2 is fully connected and sealed against the passage of fluid except through the housing section bores 12 and 14 so that fluid may pass between the flowlines F-1 and F-2.

The camming surfaces 27c of the housing section 11 and 33c of sleeve 33 are actually helically directed to give a thread-like appearance. The camming surface 33f of the sleeve 33 and the camming surface 34c of the force transfer sleeve 34 are helically directed in a thread-like manner in the opposite direction from the surfaces 33e and 27c. The purpose of oppositely threading the camming surfaces on the right side 33b versus the left side 33d of the actuator sleeve 33 is to cause or provide a wedging reaction to flowline F-2 exerting tension or compression forces on the sleeve 33. If the housing section 11 is split somehow, then the camming surfaces may be simply independent radially directed surfaces which are complementary in inclination as previously described.

The actuator sleeve or collet 33 cooperates with the force transfer sleeve 34 to move both the seal ring 38 and the sleeve 33 into this tremendously strong gripping position with the outside surface 24 of the flowline F-2. The force of gripping of the inside serrated surface 38a of the seal ring 38 is so strong that a molecular bonding or fusing occurs at the grain boundaries between the ring 38, and the flowline surface 24 to provide a tremendously strong gripping force which also seals. The reduced contact area provided in seal surface 38a by groove 38b reduces the the amount of force necessary to accomplish this forging action.

Should it be necessary or desirable to disconnect the flowline F-2 from the flowline F-1, the procedure described can be reversed, and the coupling C may be re-used thereafter on the same or different flowlines or pipes.

Although the invention has been described for a metal-to-metal seal by the seal ring 38, the invention is not limited thereto, since other equivalent materials may be used, so long as they provide the conformability of the surfaces, adhesion and cohesion for an effective seal in underwater and pressure conditions.

The variable distance coupling device C' illustrated in FIG. 5 is a second embodiment of this invention for connecting together the flowlines F-1 and F-2. Since the structure of the variable distance coupling device C' is similar in many respects to the device C, the same numbers and letters will be utilized wherever possible.

The variable distance coupling device C' of FIG. 5 again includes a first housing section 10 which terminates on one end in flange 21. The portion of the first housing section 10 to the left of FIG. 5 is identical to the end illustrated in FIG. 2. The housing section 10 thus includes an overall bore 12 and an enlarged bore portion 12c which terminates in a flared bore end portion 21a. The enlarged bore portion 12c is of sufficient diameter to receive the end of the second flowline F-2 having outside surface 24.

Intermediate housing section 55 is positioned between the first housing section 10 and the second housing section 11 for connection with both housing sections. The second housing section 11 terminates in a flange 25 at end 11a adjacent to the third or intermediate housing section 55. The second housing section 11 includes an overall bore generally designated by the number 14. The bore 14 includes a first bore portion 27a and a second bore portion 27b, the second bore portion 27b being of an overall average diameter which is smaller than the first bore portion 27a. The bore portion 27a is formed by smooth, cylindrical inside wall portion 27d.

The annular cap 30 is mounted at housing end 11b as previously described with respect to the coupling device C as illustrated in FIG. 3. Longitudinal movement is again defined as being in either directions indicated by arrows 31 or 31a and radial movement is indicated by the arrow 32.

The actuator sleeve 33 is again mounted within the second housing section bore 14 for movement radially inwardly into gripping engagement with the second flowline F-2. The force transfer sleeve 34 is again mounted within the bore portion 27a in engagement with the interior bore portion wall 27d and the actuator sleeve 33 for moving the actuator sleeve 33 radially inwardly into gripping engagement with the flowline. The structure, including the camming surfaces of the actuator sleeve or collet 33 and the force transfer sleeve 34 are identical to the coupling device C as illustrated in FIG. 3 and will not be described further.

The intermediate housing section 55 terminates in flange 56 adjacent to flange 21 of the first housing section 10. The intermediate housing section 55 terminates in another flange 57 adjacent to second housing flange 25. The flanges 56 and 57 are sized for hole alignment with the flanges 21 and 25 so that nut and bolt combinations 58 and 59 are used to connect the first and second housing sections 10 and 11 to the intermediate housing section 55. The intermediate housing section 55 has an internal bore 55a which is of the same diameter as the enlarged bore portion 12c of the first housing section 10 for receiving the flowline F-2 therethrough.

Flange end 57 of the intermediate housing section 55 terminates in a protruding rim 57a which has an outside diameter equal to the diameter of the second housing section bore 27a for insertion into this bore. An O-ring seal 60 is mounted in the bore 27a to sealingly engage the protruding rim or ridge 57a.

The bore 55a terminates at flange end 56 in a flared or diverging bore portion 55b which is basically identical to but opposite from the flared bore portion 21a of the first housing section 10. A sealing ring 61 is mounted in the flared bore end portions 21a and 55b of the first and intermediate housing sections 10 and 55, respectively, for movement into sealing engagement against the outside wall 24 of the flowline F-2 in response to connection of the flanges 21 and 56 together by means of nut and bolt combinations 58. A rubber gasket 62 is mounted in appropriately aligned grooves in the flange faces of flanges 21 and 56 for keeping out sand, debris and the like.

The seal ring 61 includes outside, tapered end surfaces 61a which are tapered at an angle complementary to the taper of the flared bore housing section end portions 21a and 55b. The inside surface 61c of the seal ring 61 is grooved to provide a reduced or concentrated area to be forged into the second flowline wall 24. Thus, upon connection of the first housing section flange 21 to the intermediate or third housing section flange 56 by means of nut and bolt combinations 58, the flanges are moved closer together. The movement of the flanges 21 and 56 closer together causes the flared bore portions 21a and 55b to engage and cam or wedge the complementary tapered surfaces 61a of the seal ring 61 thereby moving the seal ring 61 into sealed engagement against the second flowline wall 24.

Connection of the intermediate housing section flange 57 to the second housing section flange 25 by nut and bolt assemblies 59 causes the protruding rim or ridge 57a to move into the second housing section bore portion 27a further. At the same time, movement of the second housing section 11 toward the intermediate housing 55 causes a camming action of the interior camming surfaces 27c against the corresponding outside wall camming surfaces 33e, which compresses the actuator sleeve or collet 33 into gripping engagement with the second flowline wall 24. In addition, the camming action of the force transfer sleeve interior surfaces 34c against outside camming surfaces 33f of the sleeve 33 moves the remainder of the sleeve 33 into gripping engagement against the second flowline wall 24. The camming action of the force transfer sleeve occurs in part due to the flange rim 57a holding the force transfer sleeve in position even as the flanges 25 and 57 are connected together.

The seal ring 61 which in effect acts as a double seal by sealing aginst the passage of fluid between first housing flanges 21 and intermediate housing flange 56 and the flowline F-2, cooperates with the actuator sleeve 33, force transfer sleeve 34 and protruding flange rim 57a as well as the housing sections 10, 11 and 55 to form a grip-seal means 17' for the device C'. The tremendous gripping effect previously described is present in the embodiment of the coupling device C' of FIG. 5 also. The actuator sleeve 33 is cammed or wedged into a tremendous gripping engagement against the outside second flowline wall 24 such that there is an embedding of buttress threads of the actuator sleeve 33 into the second flowline wall 24. The device C' is again adjustable by adjusting the length of the first housing section 10 just as with the device C.

Referring to FIG. 1A, it is within the scope of this invention to attach first housing section nose 10a to a tubular member for insertion into the first and second housing sections 10 and 11. A flange 19 mounted over tubular member 70 would then connect the coupling device C to the flowline F-2 at various angular positions as described in FIG. 2 for the connection between first housing section 10 and flowline F-1.

The foregoing disclosure and description of the invention are illustrative and explanatory thereof, and various changes in the size, shape and materials as well as in the details of the illustrated construction may be made without departing from the spirit of the invention.

We claim:

1. A variable distance coupling device for coupling together first and second flowlines for the passage of fluid therethrough, comprising:
   a first housing section for connection with a first flowline and a second housing section for connection to a second flowline;
   each of said first and second housing sections having a bore formed by interior wall portions thereof to receive said second flowline and to provide for relative longitudinal movement between said housing sections and said second flowline;
   housing interconnection means for connecting said first and second housing sections together, said first and second housing sections being moved closer together by said housing interconnection means;
   grip-seal means mounted in said first and second housing sections for gripping and sealing said second flowline in said bores of said housing sections after said second flowline is longitudinally adjustably positioned in said first and second housing sections;
   said grip-seal means including a seal ring assembly positioned partly in both said first and second housing bores for movement into a sealing position with such second flowline and said interior wall portions in response to said first and second housing sections being moved closer together by said housing interconnection means;
   said grip-seal means including an actuator gripping sleeve mounted in said second housing bore about said second flowline, said actuator sleeve having an outside surface configuration cooperating with a second housing section interior wall configuration which has means therewith to cooperate with said actuator sleeve outside surface for causing said actuator sleeve to grip said second flowline in response to relative movement between said first and second housing sections;
   a force transfer sleeve mounted in said second housing bore about said actuator sleeve, said force transfer sleeve having an inside wall which cooperates with said outside surface of said actuator sleeve to move said actuator sleeve into gripping engagement with said second flowline in response to relative movement between said first and second housing sections which causes longitudinal movement of said force transfer sleeve thereby causing said actuator sleeve to move into gripping engagement with said second flowline;
   said seal ring assembly including a first, wedging seal ring positioned in said first housing section bore for movement to a sealed position between said first housing section bore and said second flowline in response to relative longitudinal movement of said force transfer sleeve; and
   said seal ring assembly including a second seal ring mounted in both said first and second housing bores about said second flowline between said force transfer sleeve and said first-mentioned seal ring for sealingly engaging said first and second housing sections.

2. The structure set forth in claim 1, including:
   first flowline connector means for mounting said first housing section at various angular positions with respect to said first flowline; and
   said first flowline connector means being mounted with said first housing section and being adapted for connection to a flange on such first flowline and including a substantially spherical end portion and an annular flange connector initially loosely mounted over said first housing section for attachment to such first flowline flange with said first housing section positioned at various angular positions with respect to such first flowline flange.

3. The structure set forth in claim 2, including: said first flowline connector means including a connecting end portion attached with said first flowline; and said spherical end portion including an annular section having a diameter slightly greater than the diameter of a receiving spherical internal bore section in said first flowline connecting end such that a metal-to-metal seal is accomplished on connection.

4. The structure set forth in claim 1, including:

said camming surfaces of said actuator sleeve which cooperates with said second housing section being oppositely inclined from said camming surface of said actuator sleeve having said force transfer sleeve mounted thereabout so that said actuator sleeve is wedged into further gripping engagement with said second flowline in spite of said first and second flowlines exerting tension or compressive forces on said coupling device.

5. A variable distance coupling device for coupling together first and second flowlines for the passage of fluid therethrough, comprising:

a first housing section for connection with a first flowline and a second housing section for connection to a second flowline;

each of said first and second housing sections having a bore formed by interior wall portions thereof to receive said second flowline and to provide for relative longitudinal movement between said housing sections and said second flowline;

a third housing section positioned between said first and second housing sections and having a bore therethrough for alignment with said first and second housing section bores for receiving such second flowline;

said first, second and third housing sections having interconnecting means for connecting said first and second housing sections to said third housing section;

seal means mounted between said first and third housing sections for sealing between said first and third housing sections and such second flowline;

grip-seal means being mounted in said second housing section bore in operative engagement with said third housing section for gripping and sealing against said second housing section bore and such second flowline in response to connection of said second and third housing sections further together, said grip-seal means including a cylindrical actuator sleeve positioned in said second housing bore and having an opening therethrough to receive such second flowline, said actuator sleeve being radially movable for movement into compressive engagement with said second flowline;

said grip-seal means further including a cylindrical force transfer sleeve mounted in said second housing section bore about said actuator sleeve; and said second housing section bore, actuator sleeve and force transfer sleeve having camming surfaces moving said actuator sleeve into gripping engagement with such second flowline in response to movement of said second housing section into connection with said third housing section.

6. The structure set forth in claim 5, including:

said third housing section including a rim portion for mounting within said second housing section bore in engagement with said force transfer sleeve for engaging said force transfer sleeve and moving said force transfer sleeve longitudinally with respect to said second housing section bore to cause said actuator sleeve to move into gripping engagement with said pipe in response to movement of said second housing section into connection with said third housing section.

7. The structure set forth in claim 5, wherein said seal means includes:

a camming seal ring positioned in a portion of both of said first and third housing section bores for receiving such second flowline for movement into sealing engagement with said second flowline in response to connection of said first and third housing sections together; and said camming seal ring having tapered end surfaces for engaging complementary tapered portions of said first and third housing section bores.

* * * * *